No. 694,995. Patented Mar. 11, 1902.
W. E. SANDERS.
CAR AXLE JOURNAL BOX.
(Application filed Aug. 3, 1901.)
(No Model.) 3 Sheets—Sheet 1.

Witnesses
Inventor
Wilbur E. Sanders
By his Attorney
Emil Starek

No. 694,995. Patented Mar. 11, 1902.
W. E. SANDERS.
CAR AXLE JOURNAL BOX.
(Application filed Aug. 3, 1901.)

(No Model.) 3 Sheets—Sheet 2.

Witnesses
Inventor
Wilbur E. Sanders
By his Attorney
Emil Starek

No. 694,995. Patented Mar. 11, 1902.
W. E. SANDERS.
CAR AXLE JOURNAL BOX.
(Application filed Aug. 3, 1901.)

(No Model.) 3 Sheets—Sheet 3.

Witnesses
Inventor
Wilbur E. Sanders
By his Attorney
Emil Stanek

UNITED STATES PATENT OFFICE.

WILBUR E. SANDERS, OF HELENA, MONTANA, ASSIGNOR OF ONE-HALF TO JOHN BERKIN, OF BOULDER, MONTANA.

CAR-AXLE JOURNAL-BOX.

SPECIFICATION forming part of Letters Patent No. 694,995, dated March 11, 1902.

Application filed August 3, 1901. Serial No. 70,817. (No model.)

*To all whom it may concern:*

Be it known that I, WILBUR E. SANDERS, a citizen of the United States, residing at Helena, in the county of Lewis and Clark and State of Montana, have invented certain new and useful Improvements in Car-Axle Journal-Boxes, of which the following is a full, clear, and exact description, reference being had to the accompanying drawings, forming a part hereof.

My invention has relation to improvements in car-axle journal-boxes; and it consists in the novel construction and combination of parts more fully set forth in the specification and pointed out in the claims.

Figure 1:
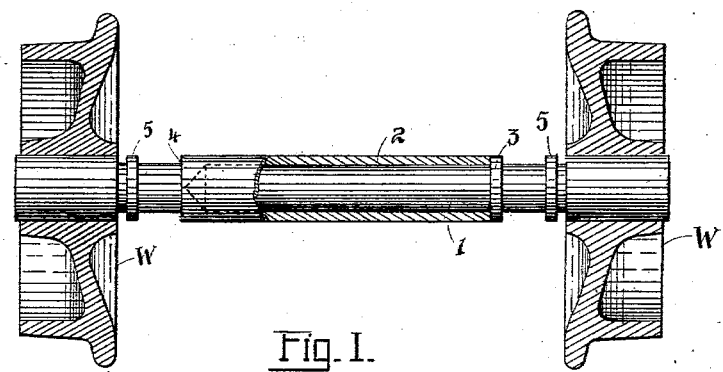
Figure 2:
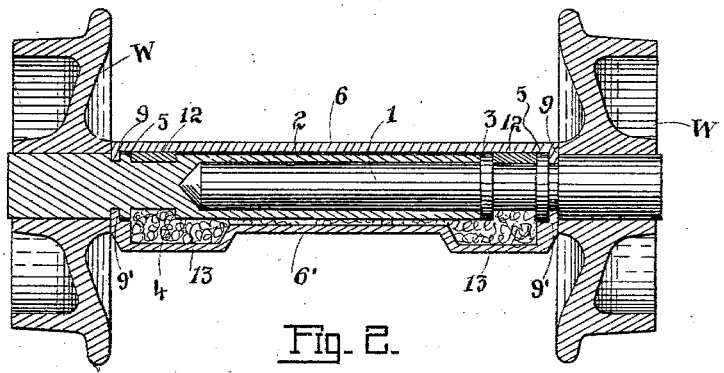
Figures 3, 4:
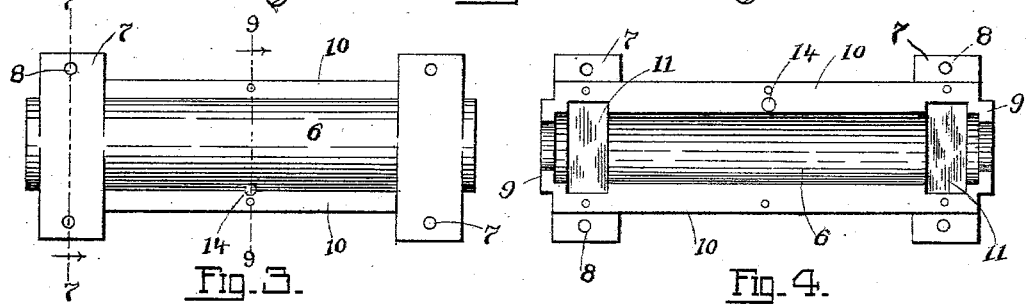
Figures 5, 6:
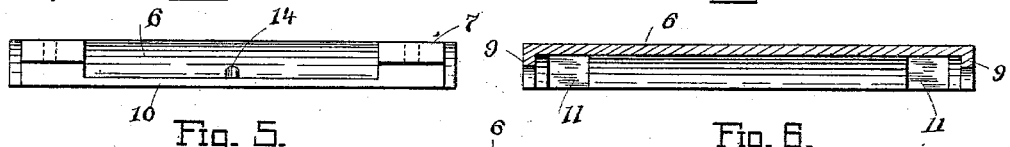
Figure 7:
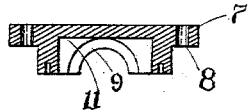
Figure 8:
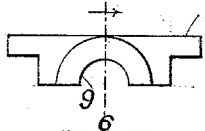
Figure 9:
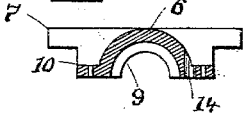
Figures 10, 11:
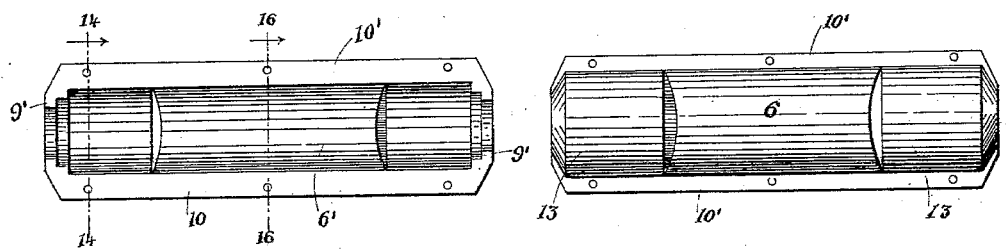
Figures 12, 13:
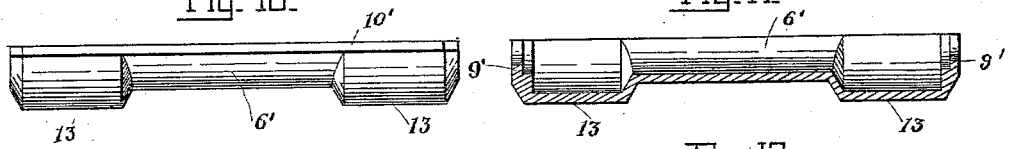
Figures 14, 15, 16:
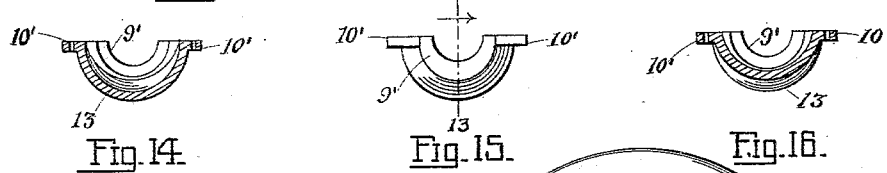
Figures 17, 18:
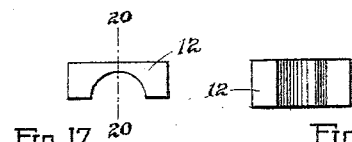
Figures 19, 20, 21:
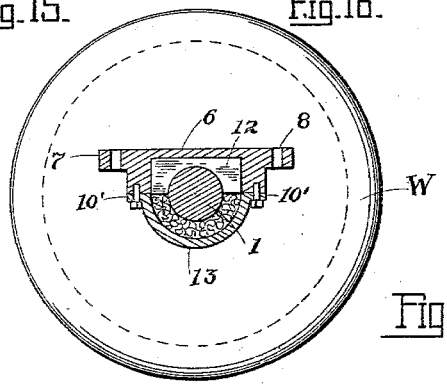
Figure 22:
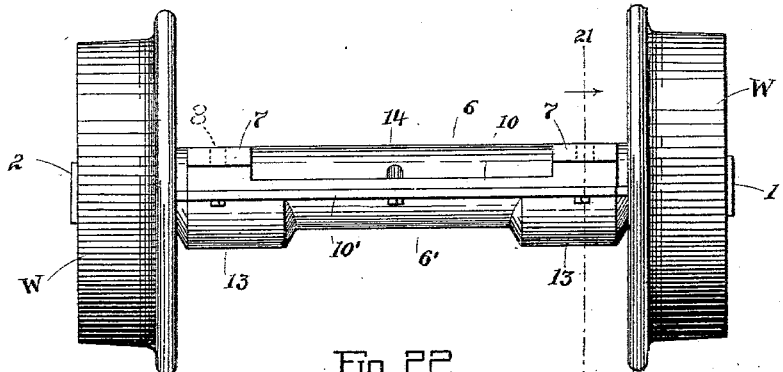
Figure 23:
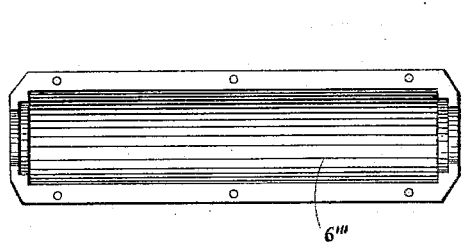
Figure 24:
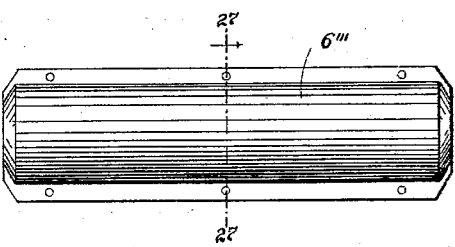
Figure 25:
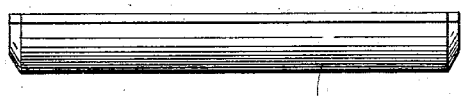
Figure 26:
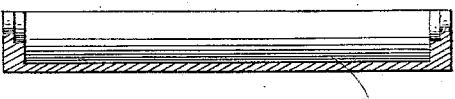
Figure 27:
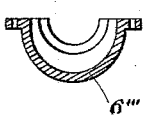
Figure 28:
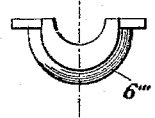
Figure 29:
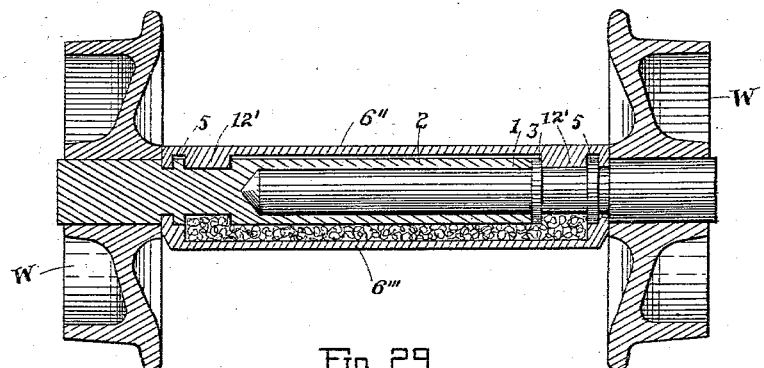
Figure 30:
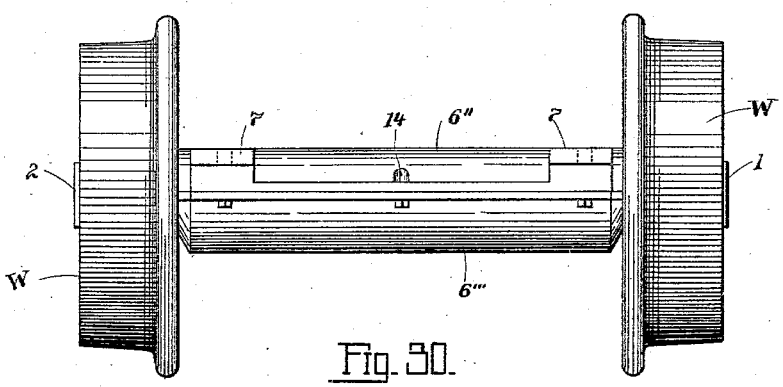

In the drawings, Figure 1 is a middle vertical sectional elevation of the male and female portions of the axle assembled. Fig. 2 is a similar view of the axle and journal-box combined. Fig. 3 is a top plan of the upper section of the journal-box. Fig. 4 is a bottom plan of the same. Fig. 5 is a side elevation of the same. Fig. 6 is a vertical longitudinal section thereof on line 6 6 of Fig. 8. Fig. 7 is a transverse section on line 7 7 of Fig. 3, taken through the wings thereof. Fig. 8 is an end view. Fig. 9 is a transverse section on line 9 9 of Fig. 3. Fig. 10 is a top plan of the lower section of the journal-box. Fig. 11 is a bottom plan thereof. Fig. 12 is a side elevation of the same. Fig. 13 is a middle vertical longitudinal section on line 13 13 of Fig. 15. Fig. 14 is a transverse section on line 14 14 of Fig. 10. Fig. 15 is an end view thereof. Fig. 16 is a transverse section on line 16 16 of Fig. 10. Fig. 17 is a side elevation of the brass bearing-block. Fig. 18 is a bottom view thereof. Fig. 19 is an end view. Fig. 20 is a transverse vertical section on line 20 20 of Fig. 17. Fig. 21 is a transverse section on line 21 21 of Fig. 22, taken through the oil-box and pocket for the bearing-block, the latter being shown in side elevation. Fig. 22 is an elevation of the axle and journal-box assembled. Fig. 23 is a top plan of the lower section of a modified form of journal-box. Fig. 24 is a bottom plan of the same. Fig. 25 is a side elevation thereof. Fig. 26 is a longitudinal vertical section on line 26 26 of Fig. 28. Fig. 27 is a transverse section on line 27 27 of Fig. 24. Fig. 28 is an end view thereof. Fig. 29 is a middle vertical section taken through the axle and the modified form of journal-box, the upper section of the journal-box showing the bearing-block cast integral therewith; and Fig. 30 is an elevation showing the axle and modified journal-box assembled.

The present invention has relation to journal-boxes which, while specially applicable to sectional axles, (or those in which the section carrying one wheel may rotate independently of the section carrying the opposite wheel,) may nevertheless be used on axles made of one piece.

The object of the invention is to produce a construction which will be dust-proof, one providing ready means for the oiling of the axle, one making provision for replaceable bearing-blocks, one which is readily assembled or taken apart, one susceptible of variable modifications without departing from the general principle inherent in its construction, one which is cheap and durable and easy to manufacture, one requiring a minimum weight of metal, one insuring against separation of the axle-sections when used in connection with sectional axles, and one possessing further and other advantages, better apparent from a detailed description of the invention, which is as follows:

Referring to the drawings, and particularly to Figs. 1 to 22, inclusive, 1 and 2 represent, respectively, the male and female sections of the axle, the former section having formed thereon at the proper point an inner collar 3, against which the adjacent end of the sleeve or female section 2 abuts when the two sections are assembled, the base of the sleeve 2 forming an annular shoulder 4 with the adjacent reduced terminal of the axle of the same depth as the collar 3. Formed on each reduced end of the respective axle-sections at points slightly removed from and adjacent to the wheels W and at suitable and equal distances from the collar 3 and shoulder 4 is an outer or terminal collar 5 for a purpose which will presently better appear.

The journal-box is composed of an upper and lower section, and in the preferred form of my invention the upper section 6 is provided with laterally-extended wings 7 7 adjacent to the ends of the section, the wings being provided with bolt-holes 8 for the reception of the bolts which enter the truck. (Not shown.) The opposite ends of the section 6 are provided with inwardly-deflected flanges 9, which are received by the annular grooves formed between the collars 5 and the wheels, thereby resulting in a construction insuring against any possible access of dust into the interior of the journal-box. The lower longitudinal edges or sides of the section 6 are provided with flanges 10 10, by which the upper journal-box section is bolted to the lower section, presently to be described. Opposite the wings 7 are formed openings or pockets 11 for the reception of suitable replaceable brass bearing-blocks 12, which when inserted in place fit snugly over the axle in the grooves formed, respectively, between the collars 3 5 of the male section of the axle and between the shoulder 4 and collar 5 of the female section, the bearing-blocks directly supporting the weight of the car on the axle.

The lower section 6' of the journal-box in the preferred form of the latter is likewise provided with terminal inwardly-turned flanges 9', similar to the flanges 9, which likewise are received by the grooves formed between the collars 5 and wheels, the said lower section being provided with longitudinal flanges 10' 10', adapted to be bolted directly to the flanges 10 of the upper section. Said lower section 6' is preferably contracted in its cross-section for a portion of its length on each side of the center thereof and then enlarges or expands to form terminal basal pockets or cup-shaped depressions 13, forming oil-boxes for the reception of cotton-waste, said oil-boxes being disposed directly under the bearing-blocks 12 and being intended to retain oil for the lubrication of the bearing-surfaces, the cotton-waste absorbing the oil and bringing it continually in contact with said bearing-surfaces and affording constant lubrication thereto. The oil is introduced through the holes 14, which are subsequently closed by cap-screws. (Not shown.)

The foregoing construction is susceptible of modifications in particulars which, while making the device better suitable to a certain class of cars, does not in any way alter the general principles or nature of the invention. These modifications are illustrated in Figs. 23 to 30, inclusive. In the first place the lower section 6''' of the journal-box is of uniform cross-section throughout its length, leaving no specially formed or depressed oil-boxes, but forming a single oil-box throughout that portion of the length of the axle as is included between the outer ends of the bearing-blocks or the inner faces of the outer collars 5 5. This modification of course does not alter the general character of the oil-box except in the particular of its extent. Again, the bearing-blocks 12 instead of being separate blocks may be cast integrally with the upper section 6'' of the modified journal-box, said integral blocks 12' being thus formed in cases where occasion for their replacement would seldom arise. This modification, too, does not alter the general character of the construction of the upper journal-box section, except that it eliminates the recess or pocket 11 necessary for the reception of the replaceable block.

A review of the foregoing therefore discloses the following particulars by which the present construction is characterized. The invention covers a sectional axle; a journal-box made up of two parts joined together at the flanges; a bearing-block of brass fitting into a prepared recess or pocket near each end of the upper section of the journal-box or its equivalent in the form of an integral bearing-block; a dust-box consisting of a flange at either end of both sections of the journal-box, said flanges fitting into a groove at either end of the car-axle, and thereby excluding dirt and grit from the interior mechanism; and an oil-box running either the full length between the bearing-blocks or confined to a position under the latter only in the shape of pockets designed to receive cotton-waste for absorbing the oil to furnish the lubricant.

The peculiar construction of journal-box prevents the separation or parting of the sections of the axle, since the bearing-blocks (independent or integral) being confined between the walls of the grooves formed in the respective axle-sections prevent the separation of the said sections under all circumstances.

It may be mentioned that the single oil-box is preferably used on short axles and the double box on long axles or where the single box would consume too much cotton-waste.

Having described my invention, what I claim is—

1. In combination with an axle having terminal grooves located adjacent to the wheels thereof, a sectional journal-box surrounding the axle and having inwardly-deflected flanges entering said grooves, longitudinal flanges at the meeting edges of the sections, bolts for coupling said flanges together, laterally-extended wings located adjacent to the ends of the upper section, pockets formed in the upper section opposite said wings, bearing-blocks carried in said pockets, the axle having grooves formed thereon for the reception of the blocks, and an oil-box at each end of the lower section below the axle, substantially as set forth.

2. In combination with an axle having terminal grooves located adjacent to the wheels thereof, a sectional journal-box surrounding the axle and having inwardly-deflected flanges entering said grooves, longitudinal flanges at the meeting edges of the sections, bolts for coupling said flanges together, laterally-extended wings located adjacent to the ends of the upper section, bearing-blocks carried by the upper section opposite said wings, and an oil-box formed at each end of the lower section below the axle, substantially as set forth.

3. In combination with an axle having terminal grooves located adjacent to the wheels thereof, a sectional journal-box surrounding the axle and having inwardly-deflected flanges entering said grooves, longitudinal flanges at the meeting edges of the sections, bolts for coupling said flanges together, laterally-extended wings located adjacent to the ends of the upper section, pockets formed in the upper section opposite said wings, bearing-blocks carried in said pockets, the axle having grooves formed thereon for the reception of the blocks, and an oil-box formed in the lower section of the journal-box below the axle, substantially as set forth.

4. In combination with an axle having terminal grooves located adjacent to the wheels thereof, a journal-box surrounding the axle and having inwardly-deflected flanges entering said grooves, upwardly-projecting laterally-extended wings carried adjacent to the ends of the journal-box, suitable bearing-blocks carried by the journal-box opposite said wings and disposed along the axle at points between and adjacent to, the aforesaid grooves, the axle having formed thereon an independent set of grooves for the reception of the bearing-blocks, substantially as set forth.

In testimony whereof I affix my signature in presence of two witnesses.

WILBUR E. SANDERS.

Witnesses:
JOSHUA C. GALBRAITH,
CARL J. HENTSCHE.